L. E. WATERMAN.
DISK DRILL.
APPLICATION FILED MAY 29, 1916.
1,253,755. Patented Jan. 15, 1918.
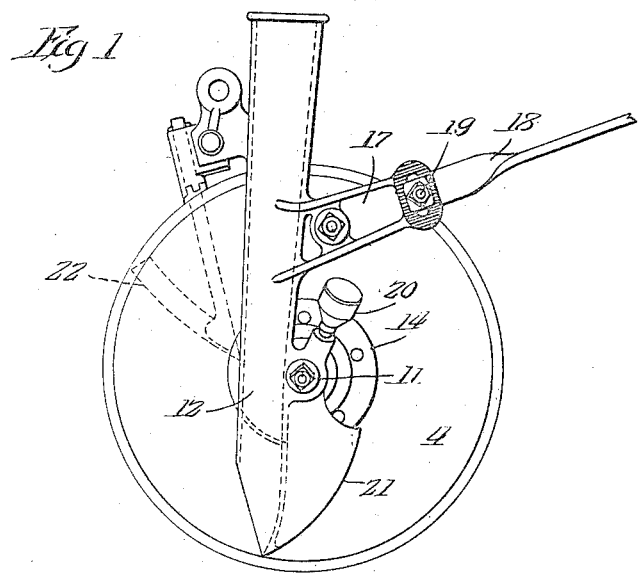
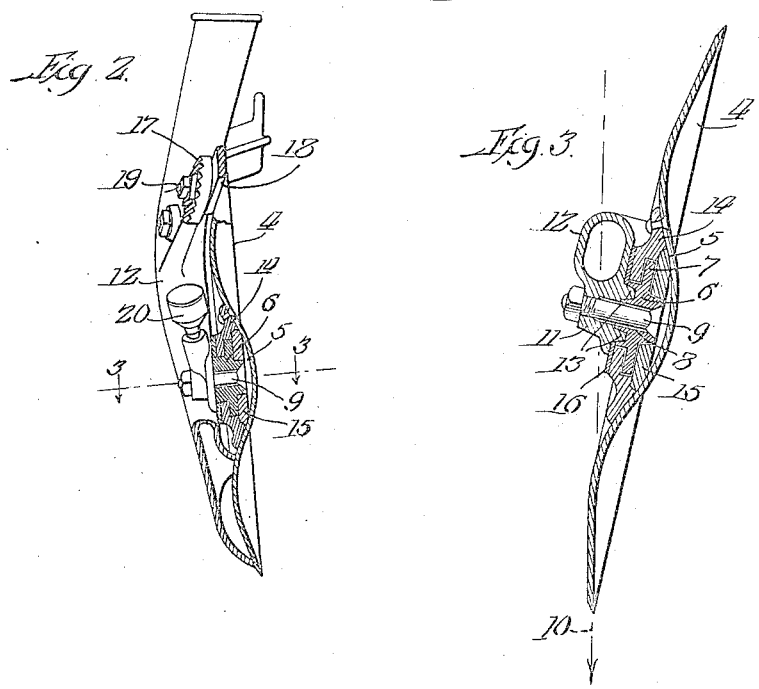

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

DISK DRILL.

1,253,755.  Specification of Letters Patent. Patented Jan. 15, 1918.

Application filed May 29, 1916. Serial No. 100,726.

*To all whom it may concern:*

Be it known that I, LEWIS E. WATERMAN, a citizen of the United States, residing at Rockford, in the county of Winnebago and State of Illinois, have invented certain new and useful Improvements in Disk Drills, of which the following is a specification.

This invention relates to disk grain drills in which a plurality of disks are arranged side by side at an angle to the line of draft to form furrows into which the seed is dropped through seed delivery boots or conduits, and has more particular reference to the mounting of the furrow-opening disks and to the relative arrangement of the disks and seed delivery boots. In this type of drill, it is desirable to so associate a seed boot with each disk that it will deposit seed in the furrow formed by the disk in close proximity to the deepest point of entry of the disk in the soil, but because of the necessarily close relation of the disks, it is extremely difficult to position and mount the disks and seed boots so that they will drill properly without collecting clods of earth, sod, and other trash.

The primary object of my invention, therefore, is to so associate and mount the disks and seed boots of a grain drill that the seeds will be properly and accurately deposited in the furrows and the possibility of trash clogging between the disks will be minimized.

Another object of my invention is to provide improved bearings for the disks which will reduce the draft of the machine and also diminish the lateral strains on the bearings.

With the above considerations in view, I have arranged a disk, preferably of the concavo-convex type, at an angle to the line of draft with the concave side of the disk facing forwardly and bulged the center portion of the disk forwardly so as to form a recess or concavity in the back of the disk adapted to receive bearing means disposed substantially within the concavity for rotatably securing the disk to a seed delivery boot located at the back of the disk in close proximity thereto and at the rear of the disk axis. This construction enables the seed boot and the disk bearing to be compactly arranged at the back of the disk so as to form practically no lateral protrusion which might obstruct trash, thereby permitting a greater clearance between the adjacent disks. Another advantage of this construction is that the entire front face of the disk is smooth and unobstructed, since there are no bearing or seed boot elements disposed on this face or projecting through the disk thereto; consequently, there will be no tendency for trash to accumulate on the face. Furthermore, by arranging the disk bearing substantially within the vertical plane of the disk, the bearing is relieved of that lateral strain to which one disposed at one side of the disk is subjected.

Other objects and attendant advantages of my invention will be apparent as the same becomes better understood by reference to the following specification when considered in connection with the accompanying drawing, wherein:

Figure 1 is a side elevation of a disk furrow opener and seed boot embodying my invention;

Fig. 2 is a vertical sectional view through the disk boot, the upper portion of the boot being shown in elevation; and Fig. 3 is a transverse sectional view taken on the line 3—3 of Fig. 2.

The furrow turning disk designated in general by reference character 4 is of the "plow turn" type, that is, of general concavo-convex form, but having its central portion bulged into the concavity of the disk, thus forming a recess in the convex side thereof. As will be seen from the drawing, this recess, designated by reference character 5, is adapted to receive the disk bearing which may be set into the disk without passing therethrough or projecting beyond the front face thereof. The bearing comprises a bearing block designated in general by reference character 6, upon which the disk rotates. The bearing block having a radially projecting annular flange 7 intermediate its ends is provided with a central aperture 8 through which a bolt 9 having a head countersunk in the inner end of the bearing block extends and passes through an aperture in a lug 11 projected forwardly from the seed boot 12, and is provided with a nut by means of which the bearing block is clamped rigidly to the seed boot. A pair of studs 13, integral with the lug 11 project into the sockets in the bearing block to hold the same against rotation.

Circular plates 14 and 15 secured to the recessed portion of the back of the disk are shaped to engage the peripheral faces of the bearing block to rotate thereon. The plate 14 is riveted at its marginal portion to the disk and bears against the plate 15, clamping it rigidly to the disk. A gasket 16 interposed between the said boot and the bearing members prevents access of dust and dirt thereto.

It will be noted that the axial width of the flange 7 is less than that of the remaining peripheral bearing face of the block 6, that is, those faces at each side of the flange. This construction while serving, through the flange, to hold the disk from lateral displacement is such that the greater length of the bearing block is of small diameter so that frictional resistance is decreased and yet a wide and efficient bearing obtained. To provide for lubricating the bearing, I have mounted an ordinary grease cup 20 on the lug 11 from which through suitable openings through the lug 11 and bearing block the lubricant may pass to the bearing faces.

The seed delivery boot positioned at the rear of the disk axis and in close proximity to the rear face of the disk is constructed so as to drop seed close to the deepest point of entry of the disk in the ground, or in other words, close to a vertical line passing through the center of the disk. The seed boot may be attached to the frame of the drill by any suitable means, and in the present instance, is provided above the disk bearing with a forwardly projecting arm 17 to which a draft rod 18 connected at its outer end to the frame (not shown), is rigidly clamped by a bolt 19. This draft attachment holds the disk at an angle to the line of draft represented by reference character 10 as is clearly illustrated in Fig. 3, so as to form a furrow into which the seed is dropped. The lower end of the seed boot is provided with an integral, forwardly projecting scraping edge shaped to scrape the rear or convex face of the disk by a shearing action. Suitable means, such as an adjustable blade scraper 22, shown only in Fig. 1, mounted on the seed boot may be employed for scraping the concave side of the disk.

From the foregoing, it will be apparent that my improvements provide a very compact arrangement of a disk, bearing therefor and a seed boot, thereby obtaining a maximum clearance between adjacent disks when the disks are arranged side by side in a series as in a grain drill; that the seed boot and bearing elements are all disposed at the rear side of the disk and well in back of the forward portion thereof so as to offer least resistance to trash, while the front face of the disk is entirely active so that it will more easily clear itself of trash; and that the bearing block is constructed to give a maximum efficiency and is arranged entirely in the track of the disk so as not to be subject to lateral strain.

I claim:

1. In a disk drill, the combination of a concavo-convex disk, the central portion of which is of reversed concavo-convex form, a seed delivery boot located at the convex side of the disk, and a bearing block upon which the disk turns, the bearing block being connected with the boot and disposed substantially within the concavity of the central portion of the disk, and said bearing block having a radially projecting annular flange engaged by a disk-connected element, the axial length of the flange being less than that of the remaining peripheral face of the bearing block.

2. The combination of a disk-carrying member, a concavo-convex disk having a reverse concavo-convex central portion forming a central depression in the rear face of the disk, a bearing block attached to said carrying member and provided with a radially disposed flange located in said depression, and means attached to said disk within said depression and coöperating with said bearing block to provide a rotary bearing for the disk disposed within said depression.

3. The combination of a disk-carrying member, a bearing block attached thereto, a concavo-convex disk having a central reverse concavo-convex portion providing a central depression in the rear face of the disk, and a bearing member fixed to said disk within said depression and shaped to coöperatively engage said bearing block so as to provide a rotatable bearing for the disk disposed within said depression.

4. The combination of a disk-carrying member, a bearing block attached thereto and provided with a radial flange intermediate its ends, a concavo-convex disk having a central reverse concavo-convex portion, and bearing means attached to said disk in the depression formed in the rear face of the disk by said central portion, said means being shaped to receive said flange and coöperate with said bearing block to provide a rotary disk bearing disposed between the planes of the forward and rear extremities of said disk.

LEWIS E. WATERMAN.